United States Patent [19]

Starnes, Jr.

[11] 4,443,586

[45] * Apr. 17, 1984

[54] TECHNIQUE FOR STABILIZATION OF VINYL CHLORIDE POLYMERS

[75] Inventor: William H. Starnes, Jr., Roselle Park, N.J.

[73] Assignee: Bell Telephone Laboratories, Incorporated, Murray Hill, N.J.

[*] Notice: The portion of the term of this patent subsequent to Jun. 7, 1994 has been disclaimed.

[21] Appl. No.: 111,105

[22] Filed: Jan. 10, 1980

Related U.S. Application Data

[63] Continuation of Ser. No. 939,248, Sep. 5, 1978, abandoned, which is a continuation of Ser. No. 809,030, Jun. 22, 1977, abandoned.

[51] Int. Cl.³ .............................. C08F 8/42; C08F 8/00
[52] U.S. Cl. ..................................... 525/370; 524/399; 525/331.5
[58] Field of Search .............................. 525/370, 331.5

[56] References Cited

U.S. PATENT DOCUMENTS 2,481,086  9/1949  Cleverdon .................. 260/45.75 K
3,862,066  1/1975  Reiter ............................ 260/23 X A
3,914,208  10/1975  Carlos ................................. 525/370
4,028,337  6/1977  Starnes, Jr. ......................... 525/343

OTHER PUBLICATIONS

Sarvetnick, H. A., Polyvinylchloride, Reinhold (NY), p. 98 (1969).
Polym. Prep., Am. Chem. Soc., Div. Polym. Chem., 16(2), 500 (1975).
Macromolecules, vol. 10, pp. 499,500, Mar., Apr. 1977.

Primary Examiner—C. A. Henderson
Attorney, Agent, or Firm—Peter V. D. Wilde

[57] ABSTRACT

A technique is described for the preparation of stable vinyl chloride polymers wherein a vinyl chloride polymer in solution is reacted with an organotin compound. The polymer is precipitated from solution and subjected to solvent extraction, the resultant polymers evidencing a stability which is comparable with that obtained by means of the conventional prior art stabilizers.

4 Claims, 1 Drawing Figure

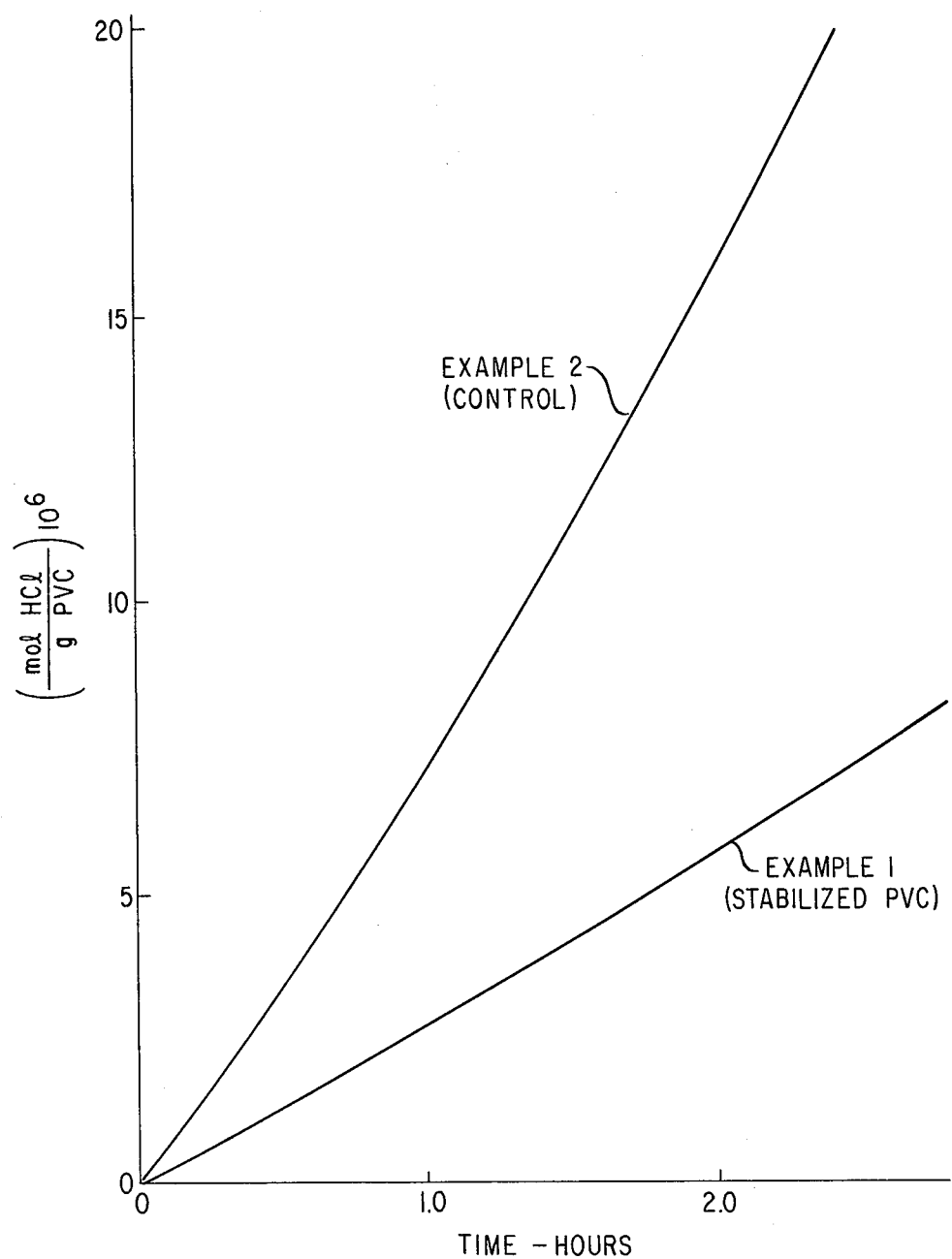

TECHNIQUE FOR STABILIZATION OF VINYL CHLORIDE POLYMERS

This is a continuation of application Ser. No. 939,248 filed Sept. 5, 1978, now abandoned, which is a continuation of application Ser. No. 809,030, filed on June 22, 1977, now abandoned.

SUMMARY OF THE INVENTION

This invention relates to a technique for the preparation of stabilized vinyl chloride polymers. More particularly, the present invention relates to the preparation of vinyl chloride polymers stabilized against nonoxidative degradation by reaction with an organotin compound.

BACKGROUND OF THE INVENTION

Vinyl chloride polymers and copolymers are known to deteriorate under the influence of heat, so resulting in alteration of the physical properties thereof and discoloration which precludes use in transparent and lightly colored articles. This thermal, nonoxidative degradation involves the sequential loss of hydrogen chloride from adjacent monomer units and results in the formation of conjugated polyene structures which impart undesirable color to the vinyl chloride polymer.

Efforts to obviate these limitations have included the use of stabilizing compositions of the $MY_2$ type wherein M is a metal cation, for example $R_2Sn^{+2}$ (R=alkyl), $Ba^{+2}$, $Cd^{+2}$, $Zn^{+2}$, $Pb^{+2}$, $Ca^{+2}$, and so forth, and Y is an organic anion. The most effective stabilizers arising from this class of compounds are those classified as organotin compounds. It has been theorized that these $MY_2$ stabilizers react with hydrogen chloride, and since hydrogen chloride is known to catalyze PVC degradation, the efficacy of these stabilizers is due in part to hydrogen chloride scavenging. However, the stabilizers are also believed to have the ability to undergo rapid and selective metathetical reactions which destroy certain PVC structural anomalies that are the active degradation sites. Accordingly, in addition to reducing the rate of color development in PVC by interrupting polyene growth, the $MY_2$ stabilizers should manifest a true chemical stabilization effect by reducing the rate of formation of total chloride.

Despite conflicting theories advanced by workers in the art relative to the described stabilization mechanism, the $MY_2$ stabilizers have been used extensively in industry. Although considered satisfactory from the standpoint of stabilization, toxicity of the heavy metal residues and ecological considerations have stimulated further evaluation of the subject compositions and have generated a search for alternatives.

In accordance with the present invention, this end is attained by means of a novel process which yields a product that is free from toxic heavy metal residues characteristic of most of the prior art. Additionally, the polymer so prepared evidences enhanced stability with respect to the unstabilized compositions, and such stability has been found comparable to that provided by many prior art vinyl chloride stabilizers.

Briefly, the inventive technique involves heating a vinyl chloride polymer in solution with an organotin compound, precipitating the vinyl chloride polymer from the reaction product, and subjecting the resultant precipitate to solvent extraction to remove heavy metal residues.

BRIEF DESCRIPTION OF THE DRAWING

The invention will be more readily understood by reference to the following detailed description taken in conjunction with the accompanying drawing.

The FIGURE is a graphical representation on coordinates of time in hours against hydrogen chloride evolution showing degradation of unstabilized PVC and a sample of PVC stabilized in accordance with the present invention.

DESCRIPTION OF DETAILED EMBODIMENTS

The vinyl chloride polymers described herein may be prepared by reacting the polymer in solution with an organotin compound of the general formula

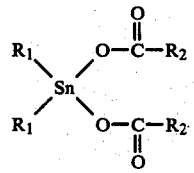

wherein $R_1$ is a hydrocarbon radical having from 1-8 carbon atoms and $R_2$ is an alkyl group having from 5-11 carbon atoms. Compounds found to be particularly useful for this purpose are di(n-butyl)tin 2-ethylhexanoate, di(n-butyl)tin dilaurate, and so forth. The organotin compound is employed in an amount ranging from 1-4 gms per gm of vinyl chloride polymer, the minimum and maximum values being dictated by practical considerations relating to the efficiency of stabilization. The reactions described herein are effected in solution, and in the process a large excess of stabilizer is employed for the purpose of assuring active site destruction. The solvent selected should readily dissolve vinyl chloride polymers and should evidence a boiling point of at least 160° C. Typical solvents employed for this purpose include o-dichlorobenzene, ethyl benzoate, methyl benzoate, benzophenone, and the like. In the operation of the process, the reaction mixture comprising a vinyl chloride polymer (which is obtained from commercial sources and has a number-average molecular weight ranging from about 30,000 to about 100,000) in solution and from 1-4 gms of organotin compound per gm of polymer (an excess beyond stoichiometry) is heated to a temperature within the range of about 170°–190° C. for a time period ranging from about 70 to 90 hours. The solvent employed tends to eliminate stabilizer dispersion difficulties encountered in solid phase systems, and the excess stabilizer enhances the rate of active site destruction by a mass action effect. The reaction may be conveniently accelerated by the use of from 0.2–2.0 gms per gm of vinyl chloride polymer of a catalyst which may be di(n-butyl)tin dichloride. This reaction is desirably effected in the presence of an inert gas, argon, nitrogen, and the like being found suitable for such purposes.

Following, the reaction mixture is cooled and the vinyl chloride polymer precipitated therefrom. Cooling is continued until a temperature less than the boiling point of the solvent selected for use in the precipitation process is attained. Solvents employed for this purpose include the lower alkanols containing from 1-6 carbon atoms, such as methanol, ethanol, and isopropanol. The solvent is added to the reaction mixture until such time as no further polymer precipitation is observed. The filtrate produced in this operation comprises o-dichlorobenzene and a plurality of tin species, as well as other soluble by-products formed during the reaction.

The polymer recovered containing physically occluded tin is then subjected to a conventional solvent extraction operation, utilizing any of the lower alkanols ($C_1$–$C_6$) as the solvent. Conveniently, this process may be effected with hot alkanol over a period of 24 hours. Finally, the recovered vinyl chloride polymer is dried and analyzed.

An example of the application of the present invention is set forth below. It is appreciated by those skilled in the art that this example is set forth solely for the purposes of exposition and is not to be construed as limiting.

EXAMPLE

The stabilization process was effected in a 3-necked, round-bottom flask heated by a thermostatically controlled oil bath and equipped with a reflux condenser connected to a pressure release valve, a ground-glass stopper, and an inert-gas fritted-disc bubbler.

Di(n-butyl)tin dilaurate (3.0 gms) and di(n-butyl)tin dichloride (1.0 gm) were added to o-dichlorobenzene (150 ml) and the mixture stirred while admitting argon into the system, the temperature being adjusted to approximately 180° C. by means of the oil bath during a one-hour period.

Following, the flask was unstoppered and 1.5 gm of vinyl chloride polymer was admitted to the system. Complete dissolution of the polymer occurred within five minutes. The reaction mixture was then heated to a temperature ranging from 180°–185° C. for 75 hours and then cooled to a temperature of about 60° C. with continued introduction of the inert gas. The reaction product was then poured into methanol (350 ml), and a heterogeneous mixture resulted, such a mixture being agitated throughout the course of the addition. After stirring for several minutes, the precipitated vinyl chloride polymer was recovered by suction filtration and washed on the fritted glass filter with fresh methanol. The polymer was then subjected to Soxhlet extraction with hot methanol for 24 hours and dried overnight prior to analysis. The rate constant for PVC dehydrochlorination was then determined and found to be $3.2 \times 10^{-6}$ moles of hydrogen chloride per gm of PVC per hour at 160.5° C.

The dehydrochlorination was carried out in a glass reaction vessel, the vinyl chloride polymer being admitted thereto in powder form in a thin uniform layer. The vessel was initially degassed by passing argon therethrough for 20 minutes at room temperature and the vessel subsequently immersed in a thermostated oil bath previously adjusted to the desired dehydrochlorination temperature. Gas exiting from the reactor was bubbled through a capillary tube into a magnetically stirred vessel containing distilled water, the pH of the water being continuously monitored. A time period of 15 minutes was allowed for thermal equilibration, and kinetic measurements were made by continuously titrating the dissolved hydrogen chloride with 0.0100 N sodium hydroxide solution. The plot of amounts of added caustic against time showed autoacceleration initially and then linearity. The value of the rate constant was then calculated from the straight line fitted to the linear portion of the curve by visual inspection.

For comparative purposes, the procedure was repeated without the use of any additives or heat treatment. The results are set forth below.

| Example | Additive g/g of PVC | Reaction Temperature, °C. | Reaction Time, hrs | Tin ppm | $\dfrac{(\text{Mol HCl})10^6}{(\text{g PVC-hr})}$ |
|---|---|---|---|---|---|
| 1 | $Bu_2Sn(Lau)_2$, 2.0 $Bu_2SnCl_2$, 0.67 | 185 | 75–76[a] | <4–76[a] | 4.8 ± 1.0[b] |
| 2 Control | No additives | No heat treatment | 0 | 0 | 10.1 ± 0.5[c] |

[a]Range of values for three complete runs of Example 1.
[b]Mean and mean deviation for three complete runs of Example 1.
[c]Mean and mean deviation for twelve runs.
$Bu_2Sn(Lau)_2$ = Di(n-butyl)tin dilaurate With reference now to the Figure, there is shown a graphical representation on coordinates of time in hours against the rate of degradation times $10^6$ for the control and for Example 1. It will be noted that the rate of degradation is significantly greater for the unstabilized sample.

What is claimed is:

1. Method for preparing a polymer comprising reacting a polyvinyl chloride polymer with an organotin compound of the general formula $$R_2Sn(O_2CR')_2$$

where R is a hydrocarbon radical having from 1–8 carbon atoms, and R' is an alkyl group having from 5–11 carbon atoms, and removing the residual organotin compound from the resulting mixture.

2. The method of claim 1 including the additional step of dissolving the polymer in a solvent prior to reacting it with the organotin compound.

3. The method of claim 2 including the step of reacting the polymer with an amount of organotin compound in addition to the maximum stoichiometric amount.

4. The method of claim 1 wherein the organotin compound is di(n-butyl) tin dilaurate.

* * * * *